(12) United States Patent
Mao

(10) Patent No.: US 10,170,965 B2
(45) Date of Patent: Jan. 1, 2019

(54) LINEAR VIBRATION MOTOR

(71) Applicant: Lubin Mao, Shenzhen (CN)

(72) Inventor: Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 271 days.

(21) Appl. No.: 15/236,669

(22) Filed: Aug. 15, 2016

(65) Prior Publication Data

US 2017/0110947 A1   Apr. 20, 2017

(30) Foreign Application Priority Data

Oct. 20, 2015   (CN) .......................... 2015 1 0685476

(51) Int. Cl.
*H02K 33/00* (2006.01)
*H02K 5/04* (2006.01)
*H02K 7/12* (2006.01)

(52) U.S. Cl.
CPC .............. *H02K 33/00* (2013.01); *H02K 5/04* (2013.01); *H02K 7/12* (2013.01)

(58) Field of Classification Search
CPC .......... H02K 33/00; H02K 33/02; H02K 33/16
See application file for complete search history.

(56) References Cited

U.S. PATENT DOCUMENTS

| 7,288,863 B2 * | 10/2007 | Kraus ................... B26B 19/282 310/37 |
| 2016/0013710 A1 * | 1/2016 | Dong ..................... H02K 33/16 310/25 |

* cited by examiner

*Primary Examiner* — Dang D Le
(74) *Attorney, Agent, or Firm* — Na Xu; IPro, PLLC

(57) ABSTRACT

A vibration motor includes a housing having an accommodation space; a vibrator accommodated in the housing; an elastic part suspending the vibrator in the housing. The elastic part includes a fixation part connecting with the vibrator, a connecting part connecting with the housing, and a bending part connecting the fixation part with the connecting part. A number of pre-compressed springs arranged on two sides of the vibrator; one end of the spring being connected with the vibrator, and the other end being connected with the housing, a pre-compression direction of the spring being vertical to a vibration direction of the vibrator.

9 Claims, 4 Drawing Sheets

LINEAR VIBRATION MOTOR

FIELD OF THE INVENTION

The present disclosure is related to vibration motors, specifically related to a vibration motor for portable consumer electronic products.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

A related linear vibration motor 1 as shown in FIG. 1, comprises a housing 11 having an accommodation space, an elastic support 13 connecting with the housing 11, a vibrator 15 suspended in the accommodation space by using the elastic support 13 and composed of a weight 151 and a permanent magnet 153, and coils facing the permanent magnet 153; the coils are accommodated in the housing 11, arranged opposite to the permanent magnet 153 with interval and positioned between the permanent magnet 153 and bottom wall of the housing 11; the end of the elastic support 13 is fixed on the housing 11 in order to support the reciprocating motion of the vibrator 15 along the horizontal direction during working.

However, the elastic support 13 provides the rigidity in direction X and provides support in direction YZ. The proportion between the rigidity of YZ direction and the rigidity of X direction is determined by the design method. Moreover, the performance of the linear vibration motor shall be affected as a result of unstable motion because the rigidity value in direction YZ is small when the rigidity value in direction X is small.

Therefore, an improved vibration motor which can overcome the problems mentioned above is accordingly desired.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood that the specific embodiment described hereby is only to explain this disclosure, not intended to limit this disclosure.

Figure 1:
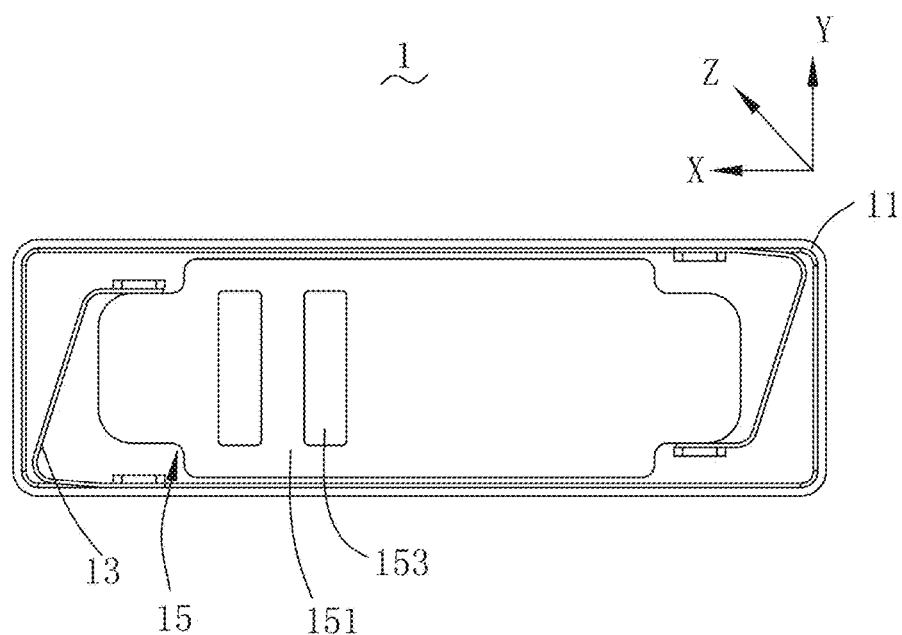
FIG. 1 is a top view of a related linear vibration motor.
Figure 2:
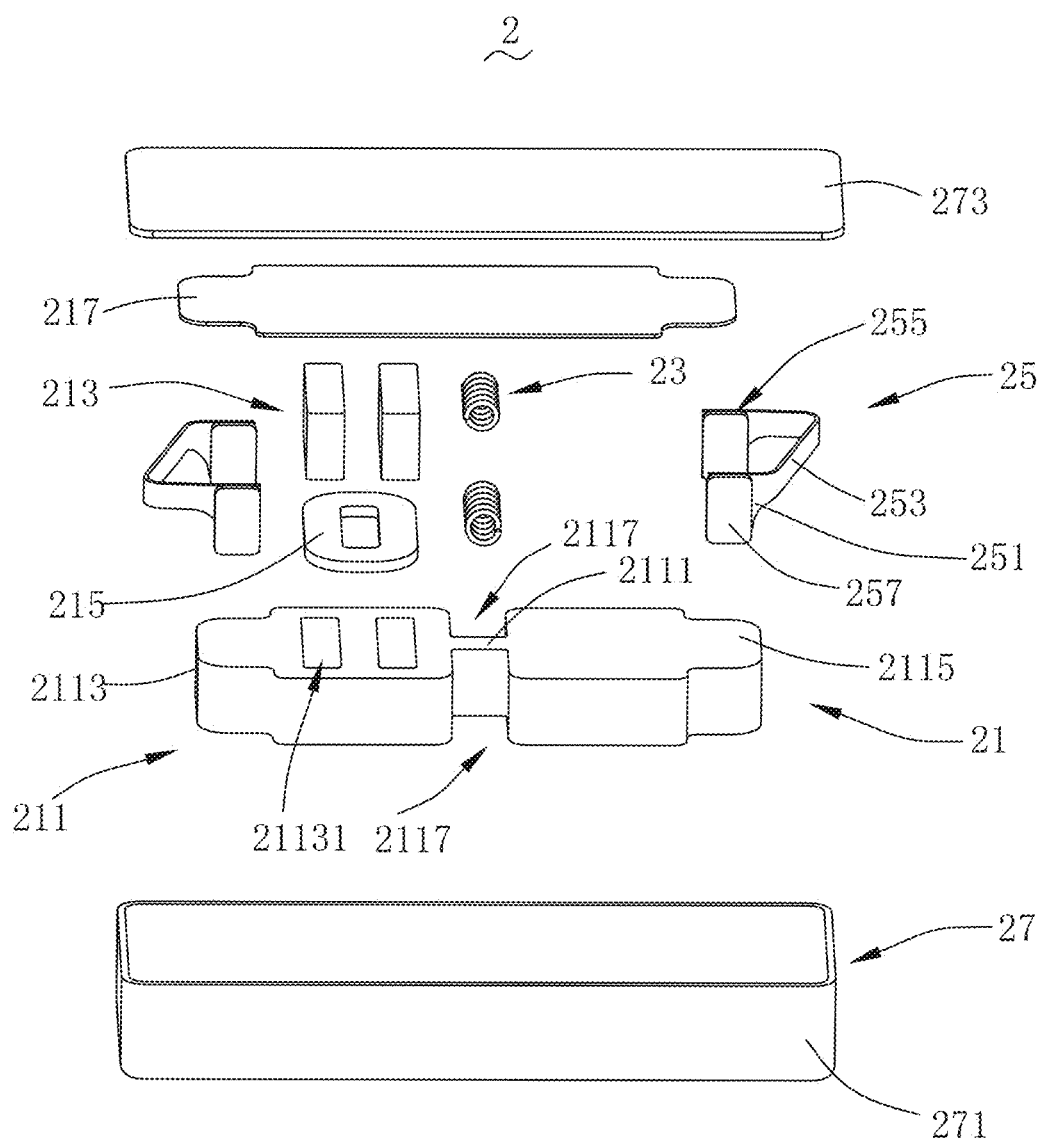
FIG. 2 is a cross-sectional view of a linear vibration motor in accordance with an exemplary embodiment of the present disclosure.
Figure 3:
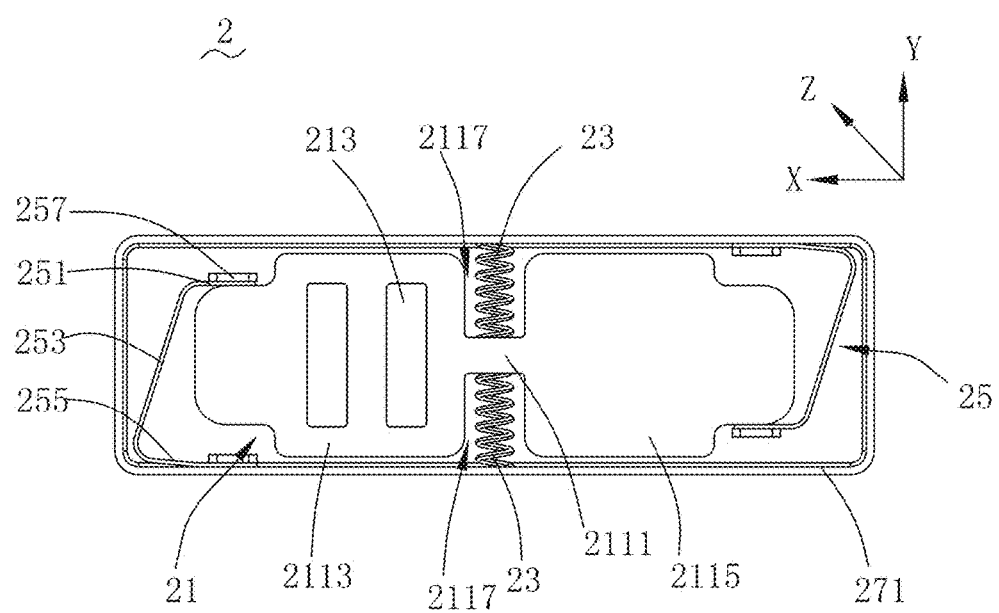
FIG. 3 is a top view of the linear vibration motor showing internal structure thereof.

Referring to FIGS. 2-3, a linear vibration motor 2, in accordance with an exemplary embodiment of the present disclosure, comprises a vibrator 21, springs 23, an elastic part 25 and a housing 27 having an accommodation space, wherein the springs 23 are arranged on two sides of the vibrator 21 symmetrically, one end of each of which is connected with the vibrator 21, and the other end thereof is connected with the housing 27; the elastic part 25 is connected with the vibrator 21; the elastic part 25, the vibrator 21 and the springs 23 are accommodated in the accommodation space of the housing 27. Moreover, the vibrator 21 is supported in the housing 27 elastically by using the elastic part 25.

The housing 27 comprises a housing body 271 having an opening on one end and a cover plate 273 which is connected with the opening end of the housing body 271; the elastic part 25, the vibrator 21 and the springs 23 are accommodated in the accommodation space of the housing 27.

The vibrator 21 comprises a weight 211, a permanent magnet 213 and a pole piece 217; the permanent magnet 213 runs through the weight 211; coils 215 are arranged opposite to the permanent magnet 213 with interval and positioned between the weight 211 and the housing body 271; the coils 213 are fixed on the inner wall of the housing 271; and the surface of the weight 211 far from one side of the coil 215 is covered by using the pole piece 217.

The weight 211 comprises a connecting block 2111, a first weight 2113 and a second weight 2115 extending along two ends of the connecting block 2111 in different directions. The first weight 2113 and the second weight 2115 are arranged symmetrically and form flutes 2117 arranged symmetrically with the connecting block 2111. And, the springs 23 are accommodated in said flutes 2117, respectively.

The first weight 2113 comprises a through hole 21131 penetrating the first weight 2113. Two permanent magnets 213 are accommodated in the through hole 21131, and the end surfaces of the permanent magnets 213 and the end surface of the weight 211 are positioned coplanar.

The coils 215 and the permanent magnet 213 are arranged oppositely to each other. The coils 215 are the flat coils, arranged between the permanent magnet 213 and the housing body 271 and fixed on the inner wall of the housing body 271. The directions of polarization of the poles of the permanent magnet 213 facing the coils 215 are opposite to each other.

The pole piece 217 is presented as a plane, covers the surface of the weight 211 far from one side of the coil 215 and is positioned between the weight 211 and the cover plate 273. The pole piece 217 is taken to prevent the permanent magnet 213 from magnetic flux leakage; therefore, more excellent electro-magnetic induction effect can be generated.

Figure 4:
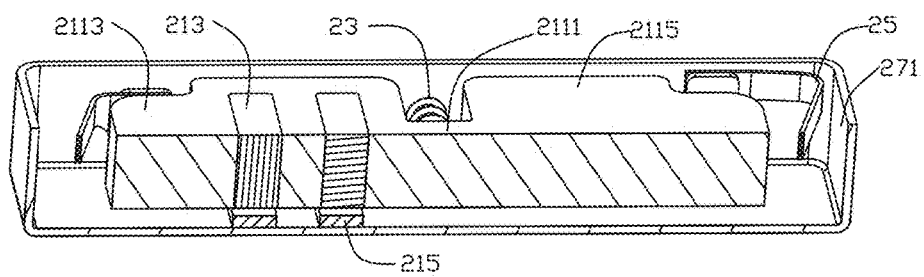
FIG. 4 is a broken view of the linear vibration motor in FIG. 3.

The springs are spiral springs symmetrically arranged in pairs, and the spiral springs have certain pre-loaded pressures after being subjected to pre-compression and are installed in the flutes 2117 symmetrically. One end of the spring 23 is connected with the vibrator, and the other end thereof is connected with the housing body 271. The spring 23 is vertical to the vibration direction of the vibrator 21. In the embodiment shown in FIGS. 2-4, one pair of springs 23 are arranged, and the each of the springs 23 is accommodated in corresponding flutes 2117 after pre-compression, respectively. The central line of two springs 23 is positioned on the identical straight line and vertical to the vibration direction of the vibrator 21. One end of each of the springs 23 is welded with the vibrator 21, and the other end thereof is welded with the housing body 271 by using the laser spot welding, that is, one end of each spring 23 is fixed on the inner wall of the flute 2117, and the other end thereof is fixed with the housing body 271 in the way of welding.

Alternatively, two pairs or multiple pairs of springs 23 shall be allowable, rather than one pair only. Each of the springs 23 can be installed in corresponding and independent flute 2117 respectively when two pair or multiple pairs of springs are available in order to avoid collision of the springs on identical side, or multiple springs on identical side can also be installed in identical flute 2117 abreast with certain interval.

The elastic parts are arranged on two ends of the weight 211 along direction X, therefore the vibrator 21 can be suspended in the accommodation space of the housing body 271. The elastic part 25 comprises a fixation part 251 connecting with the vibrator 21, a connecting part 255 connecting with the housing 271 and a bending part 253 connecting the connecting part 255 with the fixation part 251. The bending part 253 extends along the fixation part 251 in zigzag form and is connected with the connecting part 255. Therefore, each elastic part 25 is presented as the U-shaped structure approximately with opening facing the vibrator 21. Moreover, multiple barrier sheets 257 are also arranged on the elastic part 25.

The fixation part 251 comprises a third surface connecting with the vibrator 21 and a fourth surface opposite to the third surface, wherein the fourth surface faces the housing body 271. The connecting part 255 comprises a first surface facing the vibrator 21 and a second surface opposite to the first surface. The second surface is connected with the housing body 271. Optionally, the connecting part 255 of the elastic part 25 and the housing body 271 are welded together by using laser spot welding. Specifically, the second surface of the connecting part 255 of the elastic part 25 is welded with the housing body 271 by using the laser spot welding. The third surface of the fixation part 251 of the elastic part 25 is welded with the first weight 2113 by using laser spot welding. The barrier sheets 257 are arranged on the first surface and the fourth surface, respectively. Moreover, the barrier sheets 257 can be any one of square, round and other shapes applicable.

The theorem for implementing stable motion of the linear vibration motor 2 provided in the invention is as follows:

Two of said spiral springs 23 are assembled on two opposite sides of the weight 211, wherein the spiral springs 23 have certain pre-compression amounts after being subjected to compression, that is, the spiral springs 23 on the balanced positions have the pre-loaded pressure.

Certain component forces of the pre-loaded pressure of the spiral spring 23 shall exist in the directions X and Y when the vibrator 21 vibrates along the direction X, wherein the component forces of the spiral springs 23 shall be offset, while the component forces in direction X shall be superimposed in the same direction; at this moment, the reset force in direction X provided by the U-shaped elastic part 25 shall be opposite to the component force of the spiral spring 23 in the direction X, that is, the component force offered by the spiral spring 23 in the direction X is opposite to the direction of the reset force of the U-shaped elastic part 25 during movement, namely, the negative rigidity −K1 in direction X is offered by the spiral spring 23.

The advantages of the linear vibration motor 2 in the invention are as follows:

The spiral springs 23 offers the negative rigidity −K1 in direction X, the U-shaped elastic part 25 offers the positive rigidity +K2 in direction X, and the vibrator 21 offers the rigidity K in direction X; therefore, the rigidity K of the vibrator 21 is: $K=(-K1)+(+K2)<+K2$.

The requirement to the rigidity value of the spring system shall not be changed when the requirements to quality and frequency of the vibrator 21 are not kept still, that is, the reduced rigidity value as a result of the spiral spring 23 having the negative rigidity can be offset by increasing the rigidity of the U-shaped elastic part 25 in the direction X, namely, the performance can be kept still by increasing the +K2 of the U-shaped elastic part 25 in the direction X.

The rigidity value in direction YZ shall be increased correspondingly at the same time when the rigidity value in direction X is increased because the ratio confirmed of the rigidity value in direction YZ to the rigidity value in direction X is determined by the design of the U-shaped elastic part 25; therefore, the stability of the vibrator 21 can be increased;

namely, the rigidity value in direction YZ shall be increased corresponding when the rigidity value of the U-shaped elastic part 25 is increased in order to ensure the performance is not changed in terms of the design of the spiral spring 23 with negative rigidity −K1 increased; thus, the stability during movement can be increased.

The beneficial effects of the linear vibration motor provided by the invention are as follows: the negative rigidity is offered by assembling two pre-compressed springs which are arranged symmetrically; the rigidity value of the elastic part in direction X is required to increase in order to ensure the frequency of the vibrator, that is, the rigidity value of the elastic part in direction X should be increased in order to ensure the performance will not be changed. Moreover, the stability of the vibrator can be increased if the rigidity value in direction YZ is increased correspondingly when the rigidity value in direction X is increased because the ratio confirmed of the rigidity value in direction YZ to the rigidity value in direction X is determined by the design of the elastic part.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor, comprising:
   a housing having an accommodation space;
   a vibrator accommodated in the housing;
   an elastic part suspending the vibrator in the housing, the elastic part including a fixation part connecting with the vibrator, a connecting part connecting with the housing, and a bending part connecting the fixation part with the connecting part;
   a plurality of pre-compressed springs arranged on two sides of the vibrator; one end of the spring being connected with the vibrator, and the other end being connected with the housing, a pre-compression direction of the spring being vertical to a vibration direction of the vibrator;

wherein the vibrator includes a plurality of flutes for receiving the pre-compressed springs.

2. The linear vibration motor as described in claim 1, wherein the vibrator comprises a weight including a connecting block, a first weight and a second weight extending along two ends of the connecting block in different directions, the first weight and the second weight are arranged symmetrically for forming the flutes.

3. The linear vibration motor as described in claim 2, wherein the vibrator further comprises an through hole penetrating the first weight or the second weight for accommodating the permanent magnets.

4. The linear vibration motor as described in claim 3 further including a plurality of coils arranged between the vibrator and the housing.

5. The linear vibration motor as described in claim 4, wherein the vibrator further comprises a pole piece covering one surface of the weight.

6. The linear vibration motor as described in claim 1, wherein the connecting part comprises a first surface facing the vibrator, and a second surface opposite to the first surface; and the second surface is connected with the housing.

7. The linear vibration motor as described in claim 6, wherein the fixation part comprises a third surface connecting with the vibrator and a fourth surface opposite to the third surface; and the fourth surface faces the housing.

8. The linear vibration motor as described in claim 7, wherein the elastic part further comprises barrier sheets arranged on the first surface and the fourth surface respectively.

9. The linear vibration motor as described in claim 1, wherein the pre-compressed springs are spiral springs.

* * * * *